United States Patent [19]

Salem et al.

[11] Patent Number: 5,414,185
[45] Date of Patent: * May 9, 1995

[54] TREATED PILLARED CLAYS AND ALKYLATION PROCESS USING SAME

[75] Inventors: George F. Salem, Cleveland Hts.; Wayne R. Kliewer, Solon, both of Ohio

[73] Assignee: BP America, Inc., Cleveland, Ohio

[*] Notice: The portion of the term of this patent subsequent to May 30, 2011 has been disclaimed.

[21] Appl. No.: 201,167

[22] Filed: Feb. 24, 1994

Related U.S. Application Data

[62] Division of Ser. No. 40,460, Apr. 1, 1993, Pat. No. 5,308,812.

[51] Int. Cl.⁶ .................. B01J 20/16; B01J 20/10; C07C 2/62
[52] U.S. Cl. .................. 585/721; 585/467; 585/468; 502/62; 502/63; 502/81; 502/84
[58] Field of Search .................. 585/721, 467, 468; 502/62, 63, 81, 84

[56] References Cited

U.S. PATENT DOCUMENTS

| | | | |
|---|---|---|---|
| 2,564,488 | 8/1951 | Mahon | 260/671 |
| 2,574,895 | 11/1951 | Stecker | 252/450 |
| 3,121,756 | 2/1964 | Barrer | 260/674 |
| 3,148,158 | 9/1964 | Schenck et al. | 252/450 |
| 3,211,670 | 10/1965 | Kaplan et al. | 252/414 |
| 3,862,249 | 1/1975 | Ester et al. | 260/641 |
| 3,862,258 | 1/1975 | Huang et al. | 260/653.44 |
| 3,865,753 | 2/1975 | Broecker et al. | |
| 3,932,534 | 1/1976 | Fukunaga et al. | |
| 4,042,633 | 8/1977 | Woods | 260/614 R |
| 4,271,043 | 6/1981 | Vaughan et al. | 252/455 R |

(List continued on next page.)

FOREIGN PATENT DOCUMENTS

| | | |
|---|---|---|
| 0116469 | 8/1984 | European Pat. Off. . |
| 0197012 | 10/1986 | European Pat. Off. . |
| 0249352 | 12/1987 | European Pat. Off. . |
| 0250168 | 12/1987 | European Pat. Off. . |

(List continued on next page.)

OTHER PUBLICATIONS

O. Clause et al., "Preparation and Characterization of Nickel-Aluminum Mixed Oxides Obtained by Thermal Decomposition of Hydrotalcite-Type Precursors," *Journal of Catalysis* 133, pp. 231-246 (1992).

*Nitrogen No.* 187, pp. 28-29, "Partial Oxidation of Methane to Synthesis Gas," Sep.-Oct. 1990, London.

(List continued on next page.)

*Primary Examiner*—Asok Pal
*Attorney, Agent, or Firm*—David J. Untener

[57] ABSTRACT

This invention relates to a treated pillared clay made by the process comprising the steps of:

(A) contacting at least one clay with an effective amount of at least one ammonium ion source to exchange sodium and/or calcium ions in said clay for ammonium ions to provide an ammonium-containing clay, said clay comprising metal oxides and hydroxides and having a lamellar structure with lamellar layers and interlamellar spaces disposed between the lamellar layers and exchangeable sodium and/or calcium ions occupying said interlamellar spaces;

(B) contacting said ammonium-containing clay with an effective amount of at least one source of fluorine to replace at least part of the hydroxyl groups in said clay with fluorine to provide a fluorine- and ammonium-containing clay;

(C) contacting said fluorine- and ammonium-containing clay with an effective amount of at least one pillaring agent to form a fluorine-containing pillared clay; and (D) contacting said fluorine-containing pillared clay with an effective amount of at least one inorganic acid to impregnate and/or incorporate at least part of said acid on said clay.

This invention also relates to a process for making the foregoing treated pillared clays. This invention also relates to the use of these treated pillared clays as alkylation catalysts.

20 Claims, No Drawings

U.S. PATENT DOCUMENTS

| | | | |
|---|---|---|---|
| 4,299,730 | 11/1981 | Sommer et al. | 252/435 |
| 4,324,938 | 4/1982 | Cosyns et al. | 585/332 |
| 4,329,257 | 5/1982 | Sommer et al. | 252/435 |
| 4,377,419 | 3/1983 | Reed | 106/900 |
| 4,377,721 | 5/1983 | Chester et al. | 585/722 |
| 4,380,509 | 4/1983 | Sommer et al. | 252/453 |
| 4,384,161 | 5/1983 | Huang | 585/722 |
| 4,480,142 | 10/1984 | Cobb | 585/465 |
| 4,511,752 | 4/1985 | Heinerman | 585/739 |
| 4,542,250 | 9/1985 | Gregory et al. | 585/467 |
| 4,579,996 | 4/1986 | Freide et al. | 585/642 |
| 4,637,992 | 1/1987 | Lewis et al. | 502/84 |
| 4,650,779 | 3/1987 | Goldstein | 502/38 |
| 4,661,464 | 4/1987 | Atkins | 502/84 |
| 4,665,220 | 5/1987 | Gregory et al. | 560/247 |
| 4,691,073 | 9/1987 | Michaelson | 585/639 |
| 4,719,191 | 1/1988 | Battiste et al. | 502/84 |
| 4,757,040 | 7/1988 | Guan et al. | 502/63 |
| 4,774,212 | 9/1988 | Drezdon | 502/84 |
| 4,808,559 | 2/1989 | Sommer et al. | 502/63 |
| 4,844,790 | 7/1989 | Occelli | 208/46 |
| 4,868,343 | 9/1989 | King et al. | 568/697 |
| 4,918,244 | 4/1990 | Nelson et al. | 568/698 |
| 4,948,768 | 8/1990 | Kukes et al. | 502/63 |
| 4,956,518 | 9/1990 | Child et al. | 585/726 |
| 5,003,112 | 3/1991 | Knifton | 568/697 |
| 5,008,465 | 4/1991 | Ballentine et al. | 568/697 |
| 5,008,468 | 4/1991 | King et al. | 568/697 |
| 5,034,564 | 7/1991 | Kocal | 585/467 |
| 5,043,518 | 8/1991 | Michaelson et al. | 585/639 |
| 5,059,737 | 10/1991 | Chao et al. | 585/466 |
| 5,075,089 | 12/1991 | Misra et al. | 502/80 |
| 5,079,203 | 1/1992 | Pinnavaia et al. | 502/84 |
| 5,081,318 | 1/1992 | Knifton | 568/698 |
| 5,097,085 | 3/1992 | Sanderson et al. | 585/255 |
| 5,099,072 | 3/1992 | Knifton | 568/698 |
| 5,114,895 | 5/1992 | Holmgren et al. | 502/84 |
| 5,157,162 | 10/1992 | Knifton | 568/698 |
| 5,160,032 | 11/1992 | Holmgren et al. | 208/46 |
| 5,246,899 | 9/1993 | Bhattacharyya | 502/74 |
| 5,308,812 | 5/1994 | Salem et al. | 502/63 |

FOREIGN PATENT DOCUMENTS

| | | |
|---|---|---|
| 0466305 | 1/1992 | European Pat. Off. |
| 2461482 | 7/1976 | Germany . |
| 1509557 | 5/1978 | United Kingdom . |
| 2085314 | 4/1982 | United Kingdom . |
| 2179563 | 7/1985 | United Kingdom . |
| 2188251 | 9/1987 | United Kingdom . |
| 8503015 | 7/1985 | WIPO . |
| 8503016 | 7/1985 | WIPO . |

OTHER PUBLICATIONS

J. R. H. Ross et al., "Evidence for the Participation of Surface Nickel Aluminate Sites in the Steam Reforming of Methane Over Nickel/Alumina Catalysts," *Journal of Catalysis* 52, pp. 280–290 (1978).

Adams et al, "Methyl t-Bytyl Ether (MTBE) Production: A Comparison of Montmorillonite-Derived Catalysts with an Ion-Exchange Resin", *Clays and Clay Minerals*, vol. 34, No. 5, 597–603, 1986.

Adams et al, "Reactions of Alcohols with Alkenes Over an Aluminum-Exchanged Montmorillonite", *Clays and Clay Minerals*, vol. 31, No. 2, 129–136, 1983.

Atkins, "Modified Alumina Pillared Clays as Catalysts for Glycol Ether Production", pp. 159–165. Current Trends Appl, (1989).

Ballantine et al, "Organic Reactions Catalysed by Sheet Silicates: Ether Formation by the Intermolecular Dehydration of Alcohols and by Addition of Alcohols to Alkenes", Journal of Molecular Catalysis, 26 (1984) 37–56.

Ballantine, "The Reactions in Clays and Pillared Clays", Chemical Reactions in Organic and Inorganic Constrained Systems, 197 212, 1986.

Ballantine et al, "The Influence of Interlayer Water on Clay Catalysts, Interlamellar Conversions of 2-Methylpropene", *Chemistry Letters*, pp. 763–766, 1985.

Bruce et al, "Pillared Clays as Catalysts", *Chemistry in Australia*, Aug. 1988, pp. 277–279.

Burch et al, "Zr-Containing Pillared Interlayer Clays", *Journal of Catalysis*, 97, pp. 511–515, (1986).

Butruille et al, "Fluorine-Mediated Acidity of Alumina-Pillared Fluorohectorite", Journal of Catalysis 139, pp. 664–678 (1993).

Butruille et al, "Propene Alkylation of Biphenyl Catalyzed by Alumina Pillared Clays and Related Acidic Oxides", Catalysis Letters 12, (1992) 187–192.

Butruille et al, "Propene Alkylation of Liquid Phase Biphenyl Catalyzed by Alumina Pillared Clay Catalysts", Catalysis Today 14 (1992) 141–154.

Butruille et al, "Propene Alkylation of Biphenyl Catalyzed by Pillared Clays", American Chemical Society, N.Y., Aug. 25–30, 1991, pp. 418 to 422.

Bylina et al, "Chemical Conversions Using Sheet Silicates: Simple Method for Producing Methyl-t-Butyl Ether", J.C.S. Chem. Comm, 1980, pp. 1003–1004.

Chen et al, "Chromia-Chromium Phosphates as Solid (List continued on next page.)

OTHER PUBLICATIONS

Acid Catalysts", J. C. Baltzer A.G. Scientific Publishing Company, Catalysis Letters 16, (1992), 447–453.

Doblin et al, "Hydrocracking and Isomerization of n-Octane and 2,2,4-trimethylpentane Over a Platinum-/Alumina Pillared Clay", Applied Catalysis, 70 (1991), 197–212.

Figueras, "Pillared Clays as Catalysts", Catal. Rev.—Sci. Eng., 30(3), 457–499 (1988).

Horio et al, "Alkylation of Toluene With Methanol on Alumina-Pillared Montmorillonite", Applied Catalysis, 72 (1991), 109–118.

Kostapapas et al, "Selective Placement of $Fe^{+3}$ Ions in Pillared Clay Catalysis", P. A. Jacobs Editor, 1989, pp. 399–409.

Sakurai et al, "Acidity Enhanced Pillared Clay Catalysts . . . ", The Chemical Socity of Japan, Oct., 1989, Bull. Chem. Soc, Jpn. 62,3221–3228, (1989).

Sakurai et al, "New Acidic Pillared Clay Catalysts Prepared From Fluor-Tetrasilicic Mica", J. Chem. Soc., Chem. Commun., 1988, 1519–1520.

Shabtai et al, "Cross-Linked Smectites, III. Synthesis and Properties of Hydroxy-Aluminum Hectorites and Fluorhectorites", Clays and Clay Minerals, vol. 32, No. 2, 99–107, 1984.

Sterte et al, "Cross-Linked Smectites, v. Synthesis and Properties of Hydroxy-Silicoaluminum Montmorillonites and Fluorhectorites", Clays and Clay Minerals, vol. 35, No. 6, 429–439, 1987.

Sterte, "Hydrothermal Stability and Catalytic Cracking Performance of Some Pillared Clays", Dept. of Engr., Chalmers University, Chapter 10, 1990.

Thomas, "Solid Acid Catalysts", Scientific American, Apr. 1992, pp. 112–118.

Tokarz et al, "Cross-Linked Smectites, IV. Preparation and Properties of Hydroxyaluminum-Pillared Ce- and La-Montmorillonites and Fluorinated $NH_4^+$-Montmorillonites", Clays and Clay Materials, vol. 33, No. 2, 89–98, 1985.

Urabe et al, "Pillared Synthetic Saponite as an Efficient Alkylation Catalyst", Dept. of Syn. Chem., Nagoya University, J. Chem. Soc., Chem. Commun, 1986, pp. 1074–1076.

Westlake, et al, "The Use of Layered Clays for the Production of Petrochemicals", ACTA Phys. Chem 31(1-2), 301–308, 1985.

TREATED PILLARED CLAYS AND ALKYLATION PROCESS USING SAME

This is a division of application Ser. No. 08/040,460, filed Apr. 1, 1993, now U.S. Pat. No. 5,308,812.

TECHNICAL FIELD

This invention relates to treated pillared clays and their use as alkylation catalysts.

BACKGROUND OF THE INVENTION

Natural and synthetic clays having lamellar structures with interlamellar spaces disposed between the lamellar layers are well known. Smectites, such as bentonite, montmorillonites and the like are a class of clays possessing such a lamellar structure. Montmorillonite has an idealized stoichiometric composition corresponding to $Na_{0.67}Al_{3.33}Mg_{0.67}(Si_8)O_{20}(OH)_4$. Structurally, it comprises a central layer containing octrahedrally coordinated aluminum and magnesium in the form of their oxides and hydroxides sandwiched between two layers containing tetrahedrally coordinated silicon essentially in the form of its oxide. Normally in nature cations are present to compensate for the charge imbalance caused by isomorphous substitution of $Mg^{2+}$ for $Al^{3+}$ in the octahedral layer, and/or $Al^{3+}$ or other ions for $Si^{4+}$ in the tetrahedral layers. The octrahedral and tetrahedral regions are tightly bound together to form a lamellar layer. The space between these lamellar layers, i.e., the interlamellar space, in natural clays is normally occupied by exchangeable $Ca^{2+}$ or $Na^+$ ions. The distance between the interlamellar layers can be substantially increased by absorption of a variety of polar molecules such as water, ethylene glycol, amines, etc., which enter the interlamellar space and in doing so push apart the lamellar layers. The interlamellar spaces tend to collapse when the molecules occupying the space are removed, for example by heating the clay at a high temperature.

U.S. Pat. Nos. 4,216,188 and 4,248,739 disclose stabilized pillared interlayered clays in which the layers are separated and supported by "pillars" of oligomeric or polymeric species derived from metal hydroxides. In U.S. Pat. No. 4,248,739 the use of the pillared interlayered clays as sorbents, catalysts and catalytic supports is described.

Alkylation is a reaction in which an alkyl group is added to an organic molecule. The reaction of an isoparaffin with an olefin to provide an isoparaffin of higher molecular weight is an example of such a reaction. The reaction of $C_2$ to $C_5$ olefins with isobutane in the presence of an acidic catalyst to produce so-called "alkylates" has resulted in the manufacture of valuable blending components for gasoline, due to the fact that these alkylates have high octane ratings.

Traditionally, industrial alkylation processes for making isoparaffin-olefin alkylates include the use of hydrofluoric acid or sulfuric acid as catalysts under controlled temperature conditions. Low temperatures are utilized in the sulfuric acid process to minimize the side reaction of olefin polymerization, and the acid strength is generally maintained at 88 to 94% by the continuous addition of fresh acid and the continuous withdrawal of spent acid. The hydrofluoric acid process is less temperature-sensitive and the acid is easily recovered and purified. These processes have inherent drawbacks including environmental concerns, acid consumption and sludge disposal as well as problems relating to the handling and disposal of corrosive materials.

Substantial efforts have been made to develop commercially acceptable isoparaffin-olefin alkylation processes using solid catalysts. A wide variety of materials have been examined as potential catalysts for these processes, including ion-exchange resins and zeolites. Alone, both the ion-exchange resins and zeolites have low activity and deactivate rapidly. However, the addition of Lewis acids, such as $BF_3$, to these materials enhance both activity and selectivity. Clays, such as montmorillonite, have been shown to possess the ability to promote organic reactions as acid catalysts. However, they have been superseded by other materials such as zeolites because of their lack of thermal stability at higher temperatures.

With the increasing demands for higher octane gasolines and the increasing environmental concerns, it would be advantageous to develop an isoparaffin-olefin alkylation process based on a solid catalyst. The treated pillared clay catalysts of the present invention offer refiners a more environmentally acceptable isoparaffin-olefin alkylation process than the currently used hydrofluoric and sulfuric acid alkylation processes.

SUMMARY OF THE INVENTION

This invention relates to a treated pillared clay made by the process comprising the steps of:
(A) contacting at least one clay with an effective amount of at least one ammonium ion source to exchange sodium and/or calcium ions in said clay for ammonium ions to provide an ammonium-containing clay, said clay comprising metal oxides and hydroxides and having a lamellar structure with lamellar layers and interlamellar spaces disposed between the lamellar layers and exchangeable sodium and/or calcium ions occupying said interlamellar spaces;
(B) contacting said ammonium-containing clay with an effective amount of at least one source of fluorine to replace at least part of the hydroxyl groups in said clay with fluorine to provide a fluorine- and ammonium-containing clay;
(C) contacting said fluorine- and ammonium-containing clay with an effective amount of at least one pillaring agent to form a fluorine-containing pillared clay; and
(D) contacting said fluorine-containing pillared clay with an effective amount of at least one inorganic acid to impregnate and/or incorporate at least part of said acid on said clay.

This invention also relates to a process for making the foregoing treated pillared clays. This invention also relates to the use of these treated pillared clays as alkylation catalysts.

DESCRIPTION OF THE PREFERRED EMBODIMENTS

Treated Pillared Clays

The clays that are useful in making the treated pillared clays of the invention can be any natural or synthetic clay having a lamellar structure having lamellar layers with interlamellar spaces disposed between the lamellar layers. Smectites, such as bentonite, montmorillonite, berdellite, hectorite, vermiculite and the like, are a class of clays possessing such a lamellar structure. Montmorillonite is especially useful.

Montmorillonite has an idealized stoichiometric composition corresponding to $Na_{0.67}Al_{3.33}Mg_{0.67}(Si_8)O_{20}(OH)_4$. Structurally, it comprises a central layer containing octrahedrally coordinated aluminum and magnesium in the form of their oxides and hydroxides sandwiched between two layers containing tetrahedrally coordinated silicon essentially in the form of its oxide. Normally in nature cations are present to compensate for the change imbalance caused by isomorphous substitution of $Mg^{2+}$ for $Al^{3+}$ in the octahedral layer, and/or $Al^{3+}$ or other ions for $Si^{4+}$ in the tetrahedral layers. The octrahedral and tetrahedral regions are tightly bound together to form a lamellar layer. The space between these lamellar layers, i.e., the interlamellar space, in natural clays is normally occupied by exchangeable $Ca^{2+}$ or $Na^+$ ions.

The first step in preparing the treated pillared clays is to contact the clay with an effective amount of an ammonium ion source to exchange all or substantially all of the exchangeable calcium and/or sodium ions in the clay for the ammonium ions. The term "substantially all" is used herein to mean that at least about 80% by weight, more preferably at least about 90% by weight, more preferably at least about 95% by weight, more preferably at least about 98% by weight of the exchangeable calcium and/or sodium ions are exchanged for ammonium ions. Examples of suitable ammonium ion sources include aqueous ammonium chloride solutions as well as aqueous ammonium salts, such as ammonium nitrate, ammonium sulfate and the like. Mixtures of these can be used. The ratio of the ammonium ion source to the clay is not critical and need only be sufficient to exchange said ammonium ion for preferably all or substantially all of the exchangeable $Ca^{2+}$ and $Na^+$ ions in the interlamellar space. The contact time is preferably from about 1 hour to about 100 hours, more preferably from about 1 hour to about 48 hours, more preferably about 3 hours to about 24 hours. The temperature is preferably from about 0° C. to about 200° C., more preferably about 20° C. to about 150° C. In one embodiment, this ion-exchange procedure is repeated one or two additional times to insure that all or substantially all of the calcium and/or sodium ions are exchanged. In one embodiment the resulting ammonium-containing clay is washed with deionized water until it is free of chloride ions as observed using silver nitrate titration.

The next step is to contact the ammonium-containing clay with an effective amount of a source of fluorine to replace at least a portion of the hydroxyl groups in the clay with fluorine to provide a fluorine- and ammonium-containing clay. Examples of suitable sources of fluorine include aqueous solutions of $NH_4F$ preferably having normalities in the range of about 1N to about 3N. In one embodiment a ratio of 15 grams of ammonium-containing clay to 1 liter of 2N $NH_4F$ solution is used. The contact time is preferably from about 1 hour to about 48 hours, more preferably about 3 hours to about 24 hours. The temperature is preferably from about 0° C. to about 200° C., more preferably about 20° C. to about 150° C. The contacting is continued until the ammonium-containing clay achieves a fluorine content of preferably at least about 0.25% by weight, more preferably from about 0.5% to about 5% by weight, more preferably about 0.5% to about 3% by weight.

The fluorine- and ammonium-containing clay is contacted with an effective amount of at least one pillaring agent to form a fluorine-containing pillared clay. These pillared clays are characterized by the insertion of an inorganic oxide into the interlamellar spaces in the clay to prop open the two adjacent lamellar layers. The pillaring agents are preferably dispersed in water prior to contacting the clay. The concentration of metal in the resulting metal hydroxide sol is generally about 0.01 to about 2 gram-atoms per liter. The inorganic oxides inserted into the interlamellar spaces are preferably oxides of Al, Zr, Si, Ti, Cr, B, or mixtures of two or more thereof, with Al and Zr being especially preferred. The precursors of these inorganic oxides are pillaring agents which are preferably polymeric hydroxy metal complexes, examples of which include polymerized aluminum chlorohydroxide, polymerized zirconium chlorohydroxide, copolymers thereof or mixtures thereof. In one embodiment the mole ratio of metal to hydroxy in the pillaring agent is from about 1.5 to about 2.5. The polymerized aluminum chlorohydroxide has the general formula: $Al_{2+n}(OH)_{3n}Cl_6$ wherein n has a value of about 4 to about 12. The polymerized zirconium chlorohydroxide possesses the following general formula: $[Zr_4(OH)_{12}(H_2O)_{12}]Cl_4$. These polymers are known in the art.

The fluorine-containing pillared clay is contacted with an effective amount of at least one inorganic acid to impregnate and/or incorporate at least a portion of said acid on said clay. Examples of such acids include phosphorous-containing acids such as phosphoric acid, orthophosphoric acid, phosphorous acid, pyrophosphoric acid, and the like; fluorine-containing acids such as trifluoromethane sulfonic acid, fluorosulfonic acid, and the like; or mixtures thereof. When the acid is a phosphorous-containing acid the contacting is continued until the phosphorous content of the fluorine-containing pillared clay is preferably from about 0.1% to about 30% by weight, more preferably about 1% to about 10% by weight. During contacting the weight ratio of acid to pillared clay is preferably from about 0.1:1 to about 10:1, more preferably about 0.25:1 to about 5:1 by weight. The contact time is preferably from about 30 minutes to about 24 hours, more preferably about 1 hour to about 12 hours. The temperature is preferably from about $-20°$ C. to about 200° C., more preferably about 0° C. to about 100° C.

The treated pillared clays of the invention may be used alone or admixed with inorganic oxide matrix components such as silica, alumina, silica-alumina, hydrogels and clays.

The treated pillared clays may be any suitable size or shape as to ensure good contact with the reactants. Examples include powder, pellets, granules, extrudates, and spheres.

The treated pillared clays are useful as catalysts in proton- or acid-catalyzed reactions such as alkylation, etherification, dehydration, hydrocracking, oligomerization, and the like. Especially preferred are alkylation reactions.

Alkylation Process

The inventive alkylation process involves a reaction in which an alkyl group is added to an organic molecule in the presence of the inventive treated pillared clay. In one embodiment, an isoparaffin is reacted with an olefin to provide an isoparaffin of higher molecular weight.

The isoparaffin reactant used in the inventive alkylation process preferably is one possessing up to about 20 carbon atoms, and more preferably is one having from about 4 to about 8 carbon atoms as, for example, isobutane, 3-methylhexane, 2-methylbutane, 2,3-dimethylbutane and 2,4-dimethylhexane.

The olefin reactant preferably contains from about 2 to about 12 carbon atoms. Representative examples include ethylene, propylene, butene-1, butene-2, isobutylene, and pentenes, etc. Particularly preferred are $C_3$ and $C_4$ olefins and mixtures thereof.

In one embodiment, an olefin having about 2 to about 5 carbon atoms is reacted with isobutane in the presence of the inventive treated pillared clay to produce alkylates useful as blending components in the manufacture of gasoline.

In general, the molar ratio of the isoparaffin reactant to the olefin is from about 1:1 to about 50:1 and is preferably in the range of from about 3:1 to about 25:1.

The operating temperature of the alkylation process can extend over a fairly broad range, for example, from about $-20°$ C. to about $400°$ C. and is preferably with the range of from about $0°$ C. to about $250°$ C. The practical upper operating temperature is often dictated by the need to avoid an undue occurrence of undesirable side reactions.

The pressures used in the alkylation process can extend over a wide range, for example, from sub-atmospheric pressures to about 5000 psig, preferably from about atmospheric pressure to about 1000 psig.

The alkylation reaction cited herein can be operated in the batch mode, semi-batch mode, or continuous flow mode. The contact or residence time between the inventive treated pillared clay and the reactants in the batch mode is preferably from about 1 hour to about 60 hours, more preferably about 3 hours to about 48 hours.

The amount of the inventive pillared clay used as a catalyst in the alkylation process can be varied over relatively wide limits. In general, the amount of catalyst, as measured by the weight hourly space velocity of the olefin, preferably ranges from about 0.01 to about 100. It will be realized by those skilled in the art that the amount of catalyst selected for a particular reaction will be determined by several variables including the reactants involved as well as the nature of the catalyst and the operating conditions used.

The particular operating conditions used in the alkylation process will depend on the specific alkylation reaction being effected. Such conditions as temperature, pressure, space velocity and molar ratio of the reactants have important effects on the overall process. Also, the operating conditions for the alkylation reaction according to this process may be varied so that the same may be conducted in gaseous phase, liquid phase or mixed liquid-vapor phase, depending upon product distribution, degree of alkylation, as well as the pressures and temperatures at which the alkylation is effected. The reactor may be either a fixed bed or a fluidized bed reactor.

The following examples are provided for purposes of illustrating the invention. Unless otherwise indicated, in the following examples as well as throughout the specification and claims, all parts and percentages are by weight, all temperatures are in degrees centigrade, and all pressures are atmospheric.

Example 1

Part A

A mixture of 141.57 grams of Accufloc 350 (a product of American Colloid Company identified as (Na, Ca)-montmorillonite) and 10130 ml. of 1N $NH_4Cl$ is stirred for 20 hours, then vacuum filtered to provide a filter cake.

Part B

The filter cake from Part A is mixed with 1 liter of 1N $NH_4Cl$ for 20 hours with stirring, then filtered to provide a filter cake.

Part C

The filter cake from Part B is mixed with 1 liter of 1N $NH_4Cl$ overnight with stirring and washed with deionized water to provide a filter cake. This filter cake is dried in air at room temperature over a two-day period.

Part D 7.5 grams of the filter cake from Part C are added to 500 ml. of a 2N ammonium fluoride solution in a 1 liter polyethylene bottle. The bottle is sealed and mixed by shaking before placing in a $60°$ C. oven. The solution is heated for 6 hours with periodic mixing. The resulting fluoride-exchanged and ammonium-exchanged clay is filtered and washed with deionized water, then dried in air.

Part E

An aqueous solution containing an aluminum- and hydroxy-containing pillaring agent is prepared by first adding 0.529 grams of $AlCl_3$ slowly to 20 ml of distilled water. 37 ml of a 0.2 molar solution of NaOH are added dropwise to the $AlCl_3$ solution with stirring. The resulting solution is maintained at room temperature for 2 weeks. The ratio of OH to Al is 1.85:1.

Part F

An aqueous suspension is prepared by adding 2 grams of the dried filter cake from Part D to 50 ml of distilled water. The pillaring agent solution from Part E is added to the aqueous suspension with stirring. The resulting mixture is stirred at room temperature overnight. The mixture is centrifuged. The resulting solids are washed in distilled water then dried at room temperature. The solids have a ratio of 2 millimoles of Al per gram of clay.

Part G 5 ml of 85% aqueous $H_3PO_4$ are added to 5 grams of the solids prepared as described in Part F. The resulting mixture is stirred for one hour, then dried overnight at $110°$ C. in a vacuum oven to provide the desired product which is in the form of treated pillared clay catalyst.

Example 2

The activity of the treated pillared clay catalyst prepared as given in Example 1 is tested in a batch operation. The test runs are conducted using a mixture of isobutane and 1-butene at a weight ratio of 10:1 (10 parts isobutane per part of 1-butene). The weight ratio of the isobutane/1-butene mixture to the catalyst is 15:1. The reaction is conducted at a pressure of 200 psig under argon and at $120°$ C. The results are as follows:

| Run No. | Temp. °C. | Run Time (Hrs.) | $C_8$ Selectivity (%)* |
| --- | --- | --- | --- |
| 1 | 120 | 120 | 84.0 |
| 2 | 120 | 24 | 89.4 |
| 3 | 120 | 24 | 93.8 |
| 4** | 120 | 24 | 97.1 |
| 5 | 120 | 24 | 98.6 |
| 6 | 120 | 72 | 99.4 |

-continued

| Run No. | Temp. °C. | Run Time (Hrs.) | C$_8$ Selectivity (%)* |
|---------|-----------|-----------------|------------------------|
| 7       | 80        | 24              | 93.9                   |
| 8       | 120       | 24              | 100                    |
| 9***    | 120       | 24              | 40                     |
| 10      | 120       | 24              | 65.2                   |
| 11****  | 120       | 72              | 99.4                   |
| 12      | 120       | 24              | 100                    |
| 13      | 120       | 24              | 100                    |

*C$_8$ selectivity corrected for isomerization of 1-butene to 2-butene.
**After Run 3, catalyst is removed and dried at 120° C.
***After Run 8, catalyst is removed and dried at 120° C. Also, only 1-butene is used in Run 9.
****Catalyst is rinsed with acetone and dried before screening in Run 11.

Example 3

The activity of the catalyst of Example 1 is tested in a fixed bed operation. The test runs are conducted using a mixture of isobutane and 1-butene at a weight ratio of 10:1. The reaction is conducted at a pressure of 150 psig under argon. The contact time is 0.5 second and the temperature is 120° C. The results are as follows:

| Run Time (Hrs.) | C$_8$ Selectivity (%)* |
|-----------------|------------------------|
| 0.0–0.5         | 76.6                   |
| 0.5–2.0         | 90.7                   |
| 2.0–4.0         | 92.1                   |
| 4.0–6.0         | 73.9                   |

*C$_8$ selectivity corrected for isomerization of 1-butene to 2-butene.

Advantages of the inventive treated pillared clays over conventional liquid acid alkylation catalysts are numerous. The base materials are inexpensive, especially relative to comparable acidic porous materials (e.g., zeolites). They are easily prepared and modified with flexibility in the control of basal spacing/pillar inter distance and ion-exchange capacity. Most importantly, the clays are non-toxic and possess a very low environmental impact. With respect to processing, (1) they are non-corrosive thereby allowing the use of inexpensive reactor materials, (2) no refrigeration is required as with conventional alkylation technology, and (3) the separation of the products from the catalyst is easier than with homogeneous systems.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A treated pillared clay, comprising:
    a clay comprising metal oxides and hydroxides and having a lamellar structure with lamellar layers and interlamellar spaces disposed between the lamellar layers and exchangeable sodium and/or calcium ions occupying said interlamellar spaces;
    at least part of said sodium and/or calcium ions being replaced by ammonium ions;
    at least part of the hydroxyl groups of said hydroxides being replaced with fluorine;
    an inorganic oxide inserted into the interlamellar spaces to prop open adjacent lamellar layers; and
    an inorganic acid impregnated and/or incorporated on said clay.

2. The treated pillared clay of claim 1 wherein said clay is a smectite.

3. The treated pillared clay of claim 1 wherein said clay is montmorillonite.

4. The treated pillared clay of claim 1 wherein at least about 80% by weight of said sodium and/or calcium ions are replaced by ammonium ions.

5. The treated pillared clay of claim 1 wherein the fluorine content of said treated pillared clay is at least about 0.25% by weight.

6. The treated pillared clay of claim 1 wherein said inorganic oxide is an oxide of Al, Zr, Si, Ti, Cr, B, or a mixture of two or more thereof.

7. The treated pillared clay of claim 1 wherein said inorganic acid is phosphorous-containing acid or a fluorine-containing acid.

8. The treated pillared clay of claim 1 wherein said inorganic acid is selected from the group consisting of phosphoric acid, orthophosphoric acid, phosphorous acid, pyrophosphoric acid, trifluoromethane sulfonic acid, fluorosulfonic acid, and mixtures of two or more thereof.

9. The treated pillared clay of claim 1 wherein said treated pillared clay is admixed with an inorganic oxide matrix component selected from the group consisting of silica, alumina, silica-alumina, hydrogels and clays.

10. The treated pillared clay of claim 1 wherein said treated pillared clay is in the form of powder, pellets, granules, extrudates or spheres.

11. A process for reacting an olefin with an isoparaffin comprising contacting said olefin with said isoparaffin under reaction conditions in the presence of a treated pillared flay, said treated pillared clay, comprising:
    a clay comprising metal oxides and hydroxides and having a lamellar structure with lamellar layers and interlamellar spaces disposed between the lamellar layers and exchangeable sodium and/or calcium ions occupying said interlamellar spaces;
    at least part of said sodium and/or calcium ions being replaced by ammonium ions;
    at least part of the hydroxyl groups of said hydroxides being replaced with fluorine;
    an inorganic oxide inserted into the interlamellar spaces to prop open adjacent lamellar layers; and
    an inorganic acid impregnated and/or incorporated on said clay.

12. The process of claim 11 wherein said olefin contains from about 2 to about 12 carbon atoms.

13. The process of claim 1 wherein said olefin is a C$_3$ or C$_4$ olefin.

14. The process of claim, 11 wherein said isoparaffin contains up to about 20 carbon atoms.

15. The process of claim 11 wherein said isoparaffin contains from about 4 to about 8 carbon atoms.

16. The process of claim 11 wherein said olefin has about 2 to about 5 carbon atoms and said isoparaffin is isobutane.

17. The process of claim 11 wherein said clay is a smectite.

18. The process of claim 11 wherein at least about 80% by weight of said sodium and/or calcium ions are replaced by ammonium ions.

19. The process of claim 11 wherein the fluorine content of said treated pillared clay is at least about 0.25% by weight.

20. The process of claim 11 wherein said inorganic acid is a phosphorous-containing acid or a fluorine-containing acid.

* * * * *